(12) United States Patent
Brown

(10) Patent No.: US 6,168,168 B1
(45) Date of Patent: Jan. 2, 2001

(54) FUEL NOZZLE

(76) Inventor: Albert W. Brown, 1207 Pembroke La., Newport Beach, CA (US) 92660

( * ) Notice: Under 35 U.S.C. 154(b), the term of this patent shall be extended for 0 days.

(21) Appl. No.: 09/150,988
(22) Filed: Sep. 10, 1998
(51) Int. Cl.⁷ ..................................................... F16L 37/22
(52) U.S. Cl. .......................... 277/637; 285/379; 277/626; 277/616; 277/614
(58) Field of Search .................................... 277/602, 608, 277/609, 612, 614, 616, 626, 637, 641, 644; 285/379, 72, 73

(56) References Cited

U.S. PATENT DOCUMENTS

| 1,424,094 | * | 7/1922 | Gunn et al. | 277/641 |
| 1,971,713 | * | 8/1934 | Greeve | 277/641 |
| 3,190,322 | | 6/1965 | Brown. | |
| 4,567,924 | | 2/1986 | Brown. | |

* cited by examiner

Primary Examiner—Anthony Knight
Assistant Examiner—E Peavey

(74) Attorney, Agent, or Firm—Knobbe, Martens, Olson & Bear, LLP

(57) ABSTRACT

An improved seal allows a fuel nozzle to be securely fastened to an aircraft refueling adaptor and the seal does not allow fuel to leak or spill. Significantly, the seal is simple to install and remove because the fuel nozzle does not have to be disassembled or removed from the fuel hose and the seal does not have to be bonded to the seal support. The seal is securely attached to the fuel nozzle without the use of adhesives because the seal is much stiffer than conventional seals, and the seal is mechanically retained in a deep annular groove in the seal support structure. The improved seal includes a body with a first leg, a second leg, a cavity and a projection which is attached to the first leg and it extends at least halfway across the width of the cavity. Desirably, the projection extends about two-thirds of the way across the width of the cavity. The seal also includes a nose with a body portion that has a width smaller than the width of the cavity, and the body portion of the nose preferably has a generally planar inner surface which is parallel to a generally planar outer surface. The seal desirably has a Shore hardness of about 90 or greater on the "A" scale and the seal is preferably constructed of a polyurethane elastomer.

32 Claims, 5 Drawing Sheets

FUEL NOZZLE

BACKGROUND OF THE INVENTION

1. Field of the Invention

This invention relates generally to a coupling that can be quickly connected and disconnected and, in particular, to a nozzle that does not allow fluid to leak or spill. More particularly, the present invention is an improved fuel nozzle and seal that can be used with standard under-wing aircraft fuel systems.

2. Description of Related Art

Conventional aircraft fueling systems include nozzles and valves for supplying fuel to aircraft fuel tanks. In general, one end of the fuel nozzle is connected to a fuel hose and the fuel hose is connected to a fuel source such as a fuel truck, underground fuel tank or fuel supply system. The other end of the fuel nozzle is connected to the aircraft fueling adaptor which is typically located on the lower wing surface of the aircraft.

A portion of a conventional aircraft fuel nozzle is shown in FIG. 1. The conventional fuel nozzle 10 includes a nozzle body 12 which has a generally cylindrical configuration and a nozzle collar 14 which is connected to the outer surface of the nozzle body. As known, the nozzle collar 14 can be rotatably mounted to the nozzle body 12 by ball bearings 16. The fuel nozzle 10 also includes a nozzle collar adaptor 18 which is configured to be mechanically connected to the fueling adaptor of the aircraft to create a fluid connection between the fueling nozzle and the fuel system of the aircraft. The nozzle collar adaptor 18 may be mechanically connected to the nozzle collar 14 or the adaptor and collar may be integrally formed as a single component. A nozzle collar bumper 20 is mounted around the outside of a portion of the nozzle collar 14 and nozzle collar adaptor 18. The nozzle collar bumper 20 is constructed of a resilient material to absorb forces applied to the fuel nozzle 10 during use and the bumper assists in preventing damage to the nozzle.

Centrally located within the fuel nozzle 10 is a poppet valve 22 which has a generally circular exterior surface 24. The poppet valve 22 is axially aligned with a vertical axis X—X which extends through the center of the fueling nozzle 10. As shown in FIG. 1, the poppet valve 22 is in a closed position, but one skilled in the art understands that the valve can move upwardly along the vertical axis X—X into an open position.

An annular seal 26 with a generally circular configuration is attached by a seal support 46 to the fuel nozzle 10, and the seal contacts and abuts the annular exterior surface 24 of the poppet valve 22 when the valve is in the closed position. The seal 26, as best seen in FIG. 2, has cylindrical inner and outer surfaces 28 and 30, and a cavity 32 divides the lower portion 33 of the seal 26 into a first leg 34 and a second leg 36. The legs 34, 36 and cavity 32 have a generally rectangular cross-section and inwardly extending into the cavity 32 from the first leg is an annular projection 38. The annular projection 38 is located at about the midpoint of the height of the cavity and the projection extends less than halfway across the width of the cavity. The upper portion 39 of the seal 26 includes an upwardly extending nose 40 with a base 41 and a curved cut-out section 42. The base 41 has a width which is approximately equal to the width of the second leg 36 and cavity 32 combined and the cut-out section 42 is shallow. The nose 40 also includes an inwardly extending annular projection 45 with a frustoconical outer surface 44 which is inclined inwardly toward the vertical axis X—X of the nozzle 10. The base of the projection 45 has a width which is approximately equal to the width of the second leg 36 and cavity 32 combined.

As seen in FIG. 1, the seal 26 is configured to fit over and be attached to a cylindrical seal support 46. The seal support 46 includes an upwardly extending annular member 48 which is configured to be inserted into the cavity 32 of the seal 26. The member 48 includes an annular groove 50 which is configured to receive the annular projection 38 located on the inside surface of the first leg 34 of the seal 26. The seal 26 is attached to the seal support 46 by an adhesive or glue that bonds the seal to the seal support. The adhesive is required to prevent the seal 26 from being dislodged or removed from the seal support 46 by the fluid pressure, which would allow the fuel to leak or spill. Additionally, the flexible seal 26 has a nose 40 with a thick base 41, shallow cut-out section 42 and short, blunt upwardly extending projection 45 because when the seal engages the aircraft fuel adaptor, these components prevent the seal from excessively deforming and allowing fuel to leak.

Another example of a conventional aircraft fuel nozzle 51 is shown in FIGS. 3 and 4. The fuel nozzle 51 includes a seal 52 with a cylindrical first wall 54 and a cylindrical second wall 56 defining a cylindrical cavity 58. The cavity 58 is configured to fit over and be attached to a seal support 60, and the seal 52 is bonded to the seal support by an adhesive or glue. The other portions of the known fuel nozzle 51 are generally the same as the conventional fuel nozzle 10 shown in FIG. 1.

The lower portion 53 of the first wall 54 of the seal 52, as seen in FIG. 4, includes a radially outwardly extending flange 62 which has a groove 64 in its lower surface. The second wall 56, which has a shorter length than the first wall 54, has a curved lower surface 66. The uppermost portion of the cavity 58 includes an inwardly extending projection 68. The upper portion 69 of the seal 52 includes an inwardly extending annular lip 70 with a horizontal lower surface 72 and an angled upper surface 74. The angled upper surface 74 is configured to engage a portion of the exterior surface 24 of the poppet valve 22 when the valve is ir the closed position to create a fluid tight seal. The upper portion 69 of the seal also includes a cylindrical nose 76 with a body portion 75 having a width approximately equal to the width of the second wall 56 and the cavity 58 combined. The nose 76 also includes an inwardly extending annular projection 77 with a tip 79 and a frustoconical outer surface 80. The base of the annular projection 77 has a width approximately equal to the width of the second wall 56 and cavity 58 combined.

As shown in FIG. 3, a conventional aircraft fuel adaptor 82, which is typically located on the lower surface of an aircraft wing 84, includes a stiffener ring 86 attached to the lower surface of the aircraft wing. The fuel adaptor 82 also includes an annular sleeve 88 which is attached to the stiffener ring 86 by a plurality of screws 90. The sleeve 88 provides a tank valve seat and allows the fuel nozzle 51 to be attached to the fuel adaptor 82. An O-ring 92 fits into a groove 94 in the sleeve 88 to create a fluid tight joint between the sleeve and the wing, surface 84.

The sleeve 88 also includes an inwardly extending annular rim 96 which is machined on its upper surface to provide a valve seat 98. Resting on the valve seat 98 is a gasket 100 which is attached to a valve disc 102. A shaft 104 extends upwardly from the valve disc 102 and the shaft is supported by a cage or spider element 106. A valve spring 108, which bears against the spider element 106 at its upper end and against the disc 102 at its lower end, tends to maintain the disc and its gasket 100 in a closed position against the rim 96.

When conventional fuel nozzles, such as the fuel nozzles 10 or 51 described above, are connected to the conventional aircraft fuel adaptor 82, the nose of the seal comes into contact with the lower surface of the inwardly extending annular rim of the adaptor and the nose of the seal is deformed. In particular, as seen in FIG. 3, the elongated nose 76 of the seal 52 contacts the annular rim 96 of the adaptor 102 and this contact causes the downward and inward deflection of the nose. Because the seal 52 is flexible, the body portion 75 of the nose 76 has a width that is about two-thirds of the width of the seal 52 to prevent the seal from excessively deforming. Additionally, the nose 76 of the seal 52 is elongated so that as the projection 77 of the nose is deflected downwardly, a sufficient portion of the nose remains in contact with the annular rim 96 of the adaptor 102 to prevent the fuel from leaking. Thus, the nose 76 of the conventional seal 52 has a large width and thickness to prevent fuel from leaking or spilling.

Additionally, these known seals must be bonded to the seal support structure because the seals lack sufficient structural integrity and rigidity to remain securely attached to the seal support during use of the nozzle. In particular, because conventional aircraft fuel systems operate at high pressures and flow rates of up to 500 gallons per minute (gpm), the fuel pressure would force the seal off the seal support if the seal was not bonded to the seal support.

Another example of a known seal and seal support used with a conventional aircraft fueling nozzle is shown in FIGS. 5 and 6. In general, the seal 110 has a lower portion 111 with a cylindrical first wall 112 and a cylindrical second wall 114 defining a cavity 116. The cavity 116 of the seal 110 has a rectangular cross-section and it is configured to fit over and be attached to an upwardly extending annular projection 118 of the seal support 120. The projection 118 has a height of about 0.3 inches and a width of about 0.25 inches. The flexible seal 110 is bonded to the projection 118 to prevent the unintended movement or displacement of the seal.

As seen in FIG. 5, the seal support 120 has a generally circular configuration with an annular body 134 having a central opening 135 about 2.3 inches in diameter. The body 134 includes an outwardly extending annular flange 136 with an upwardly extending annular lip 138 which forms an annular groove 139. The seal support 120 also includes a downwardly extending flange 140 which is about 1.8 inches in length.

As seen in FIG. 6, the seal 110, which is bonded to the projection 118 of the seal support 120 by an adhesive or glue, includes an inwardly extending lip 122 with a horizontal lower surface 124 and an angled upper surface 126. The innermost point 123 of the lip 122 extends about 0.14 inches inwardly from the inner surface 113 of the lower wall 112 and the innermost point 123 is about 0.2 inches from the base 115 of the seal 110. The inwardly angled upper surface 126 is configured to engage the exterior surface 24 of the poppet valve 22 to create a fluid tight seal when the valve is in the closed position. The angled upper surface 126 is located at an angle α of 30° with respect to the vertical and the angled surface extends from the innermost point 123 of the lip 122 to the cut-out section 130, which has a radius of 0.075 inches. The upper portion of the seal 110 includes a nose 128 with a curved cut-out section 130 and a planar surface 132. The nose 128 of the seal 110 has a large body portion and a thick extended portion to prevent the flexible seal from excessively deforming and allowing the fuel to leak. The tip 131 of the nose 128 has a radius of 0.025 inches and the planar surface 132 is at an angle β of 45° with respect to vertical. The overall height of the seal 110 is 0.57 inches and the outer diameter of the seal is about 2.97 inches.

Additional examples of conventional aircraft fueling nozzles and valves, and aircraft fueling nozzle systems are disclosed in U.S. Pat. Nos. 3,190,322 and 4,567,924 which were invented by the Applicant of the present invention, the entirety of which are incorporated by reference.

As described above, these conventional seals used in aircraft fuel systems must be bonded to the seal support to prevent the seal from unintentionally dislodging or moving because, if the seal moves, it may allow fuel to leak or spill. These conventional seals, because they are bonded to the seal supports are very difficult to remove and replace. In order to replace the seal, the entire nozzle assembly is typically removed from the fuel hose or line, and the nozzle is disassembled. Because bonding of the seal is accomplished at the factory under heat and with a special vulcanizing mold, it is not practical to replace the seal in the field, therefore both the seal and the metal part must be replaced as a complete spare part.

The nozzle must also be reassembled and reattached to the fuel hose after replacement of the seal. Thus, the standard maintenance procedure of replacing the nozzle seal is time consuming process and it involves significant labor costs, as well as the cost of the bonded seal assembly.

SUMMARY OF THE INVENTION

A need therefore exists for an aircraft fuel nozzle which incorporates a seal which is simple to install and remove, and eliminates the above-described problems.

The present invention overcomes the disadvantages of conventional aircraft fueling systems. The present invention includes a seal which allows the nozzle to be securely fastened to an aircraft refueling adaptor and the seal does not allow fuel to leak or spill while the aircraft is being refueled or while the nozzle is in a closed position. That is, the seal maintains a fluid-tight closure when the nozzle is closed and disconnected from the aircraft, and it maintains a fluid-tight coupling when the nozzle is connected to an aircraft adaptor, both when the poppet valve is in the open position and when the poppet valve is in the closed position.

The seal of the present invention advantageously is easy to manufacture and simple to install and remove. Significantly, the nozzle does not have to be disassembled or removed from the fuel hose to replace the seal and the seal does not have to be bonded to the seal support. In contrast to the designs of conventional refueling systems, the seal of the present invention is securely attached to the seal support without the use of adhesives because the seal is much stiffer than conventional seals. Additionally, the seal includes a projection which is specially configured to contact and engage a deep groove in the seal support. Significantly, the present seal and seal support do not include any complicated parts or structures which are difficult to machine or construct.

One aspect of the invention is an annular seal for all aircraft fuel nozzle including a body having an annular first leg spaced from an annular second leg by an annular cavity. A projection attached to the first leg extends at least halfway across the width of the cavity and, more preferably, about two-thirds of the way across the width of the cavity. The seal also includes a nose with a body portion that has a width smaller than the width of the cavity. Additionally, the body portion of the nose preferably has a generally cylindrical inner surface which is parallel to a generally cylindrical outer surface. The seal desirably has a Shore hardness of about 90 or greater on the "A" scale and the seal is preferably constructed of a fuel resistant polyurethane elastomer.

Another aspect of the inventions is an annular seal support for an aircraft fueling nozzle. The seal support includes a cylindrical body with a central opening and an upwardly extending annular projection that is attached to the body. The projection has a cylindrical inner surface, a cylindrical outer surface, a top and a base. The projection also includes a deep annular groove that is located in the inner surface of the projection. The annular groove has a lower surface and an upper surface, and the annular groove extends radially more than halfway across the width of the projection. The lower surface of the annular groove is preferably located between about 0.17 inches and about 0.18 inches from the base of the annular projection, and the lower surface of the annular groove is preferably spaced from the upper surface of the groove by about 0.06 inches and to about 0.07 inches.

The seal of the present invention also reduces labor cots because it saves time and effort to install and remove the seal. Further, no tools are required to remove the seal and no glues or adhesives are necessary.

Another aspect of the invention is a nozzle including a seal with an annular first leg, an annular second leg, and an annular cavity positioned between the first leg and the second leg. A radially extending projection attached to the first leg of the seal extends more than halfway across the width of the cavity. The nozzle also includes a seal support with an annular body having an upright annular support member. The support member has a slot which is configured to receive the projection from the seal. Preferably, the width of the cavity is about 0.125 inches and the width of the projection is about 0.085 inches, and the seal preferably includes a nose with a body portion having a width less than about 0.115 inches. The seal is preferably constructed of a polyurethane elastomer having a Shore hardness of about 90 or greater on the "A" scale and the seal is preferably not bonded to the seal support.

Further aspects, features and advantages of the present invention will become apparent from the detailed description of the preferred embodiments that follows.

BRIEF DESCRIPTION OF THE DRAWINGS

The appended drawings contain figures of prior art designs, which were discussed above, and figures of the preferred embodiment of the fuel nozzle. The above-mentioned features of the fuel nozzle, as well as other features, will be described in connection with the preferred embodiment; however, the illustrated embodiment is only intended to illustrate the invention and not to limit the invention. The drawings contain the following figures.

DETAILED DESCRIPTION OF THE PREFERRED EMBODIMENT

The preferred embodiment of the present invention involves an improved seal and seal support for an aircraft fuel system fuel nozzle. The principles of the present invention, however, are not limited to aircraft fuel systems and it will be understood that, in light of the present disclosure, the seal and seal support disclosed herein can be successfully used in connection with other types of nozzles, connections or couplings. For example, the seal and seal support disclosed herein can be used with various types of nozzles and couplings for the transfer of fluids, including both liquids and gases. Additionally, the seal and seal support can be used with nozzles and couplings which allow for quick attachment and detachment without the loss of the fluid being transferred.

To assist in the description of the components of the improved seal and seal support, words such as upward, downward, vertical, horizontal and transverse are used to describe the accompanying figures. It will be appreciated, however, that the present invention can be located in a variety of desired positions-including various angles, sideways and even upside down. A detailed description of th(improved nozzle and seal now follows.

Figure 1:
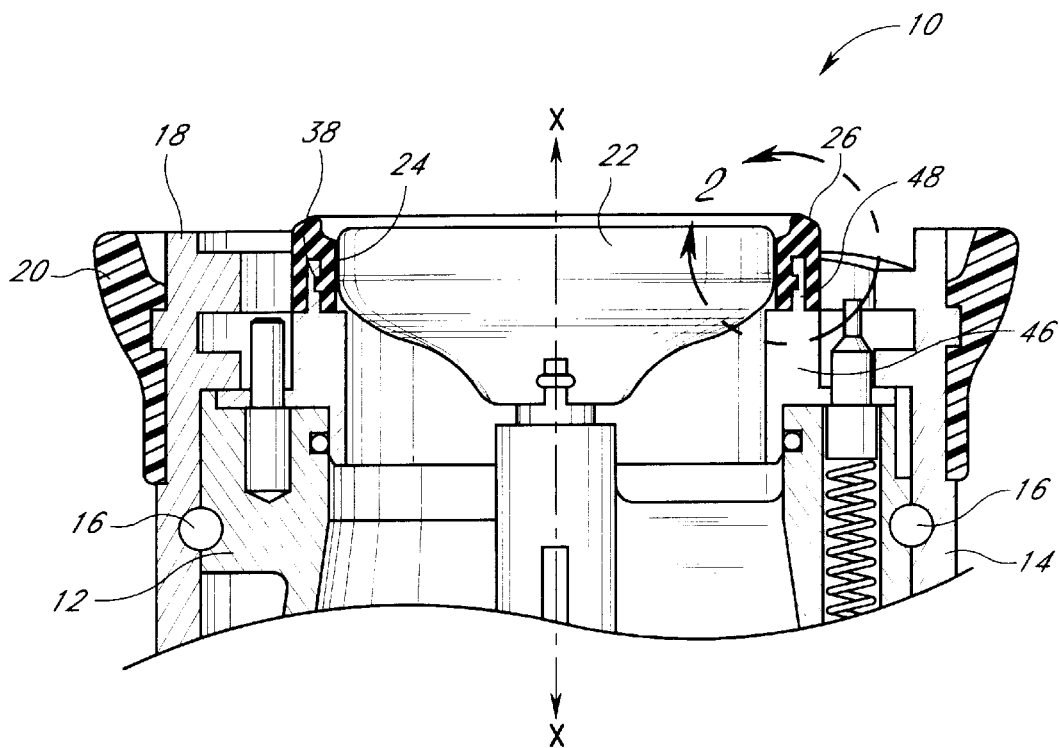
FIG. 1 is a cross-sectional side view of a conventional fuel nozzle with a portion of the fuel nozzle cut away, illustrating the nozzle poppet valve in a closed position.
Figure 2:
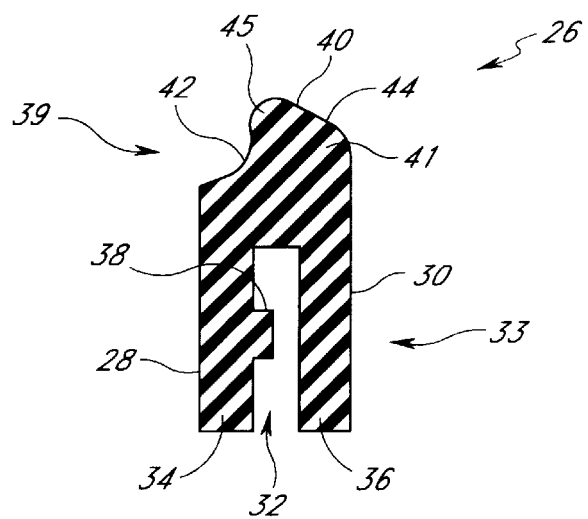
FIG. 2 is an enlarged partial cross-sectional side view taken along lines 2—2 of the conventional seal shown in FIG. 1.
Figure 3:
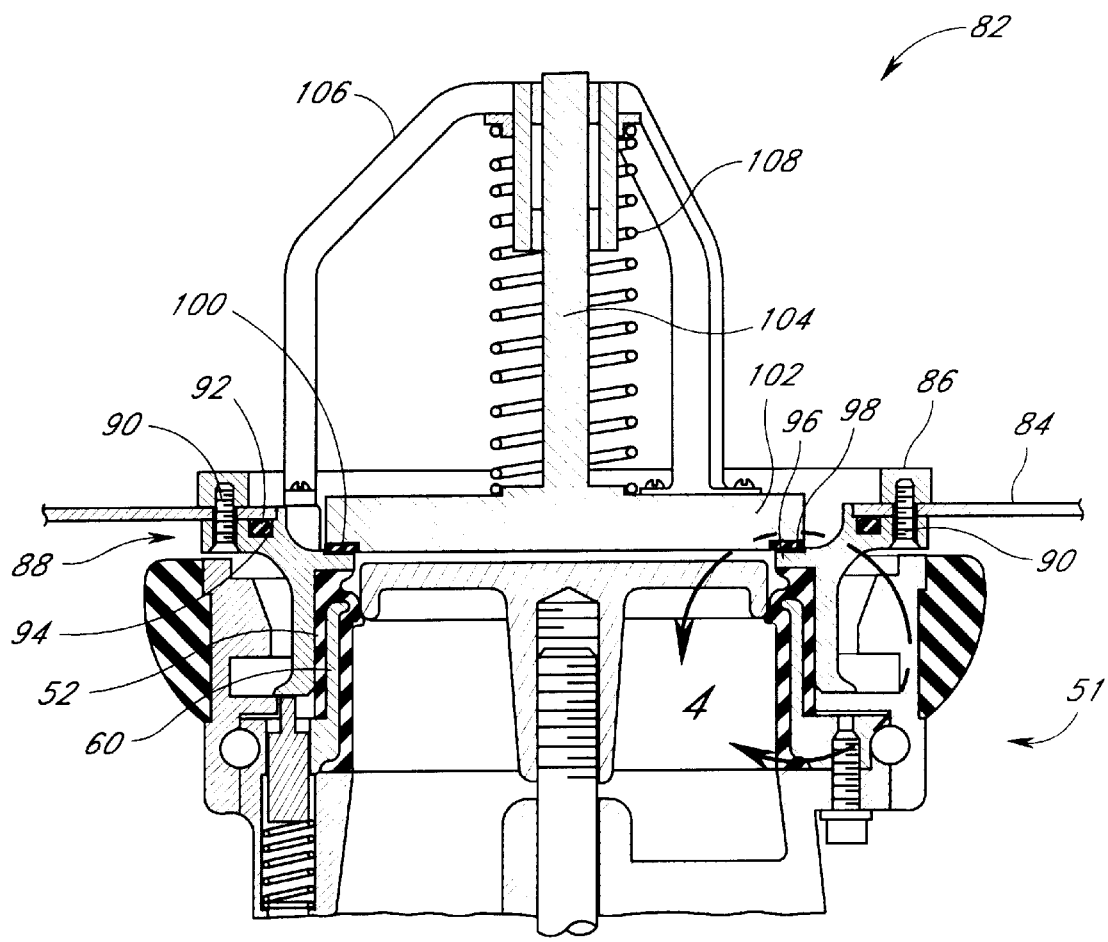
FIG. 3 is a cross-sectional side view of another conventional fuel nozzle with a portion of the fuel nozzle cut away, illustrating the fuel nozzle connected to a conventional aircraft fuel adaptor.
Figure 4:
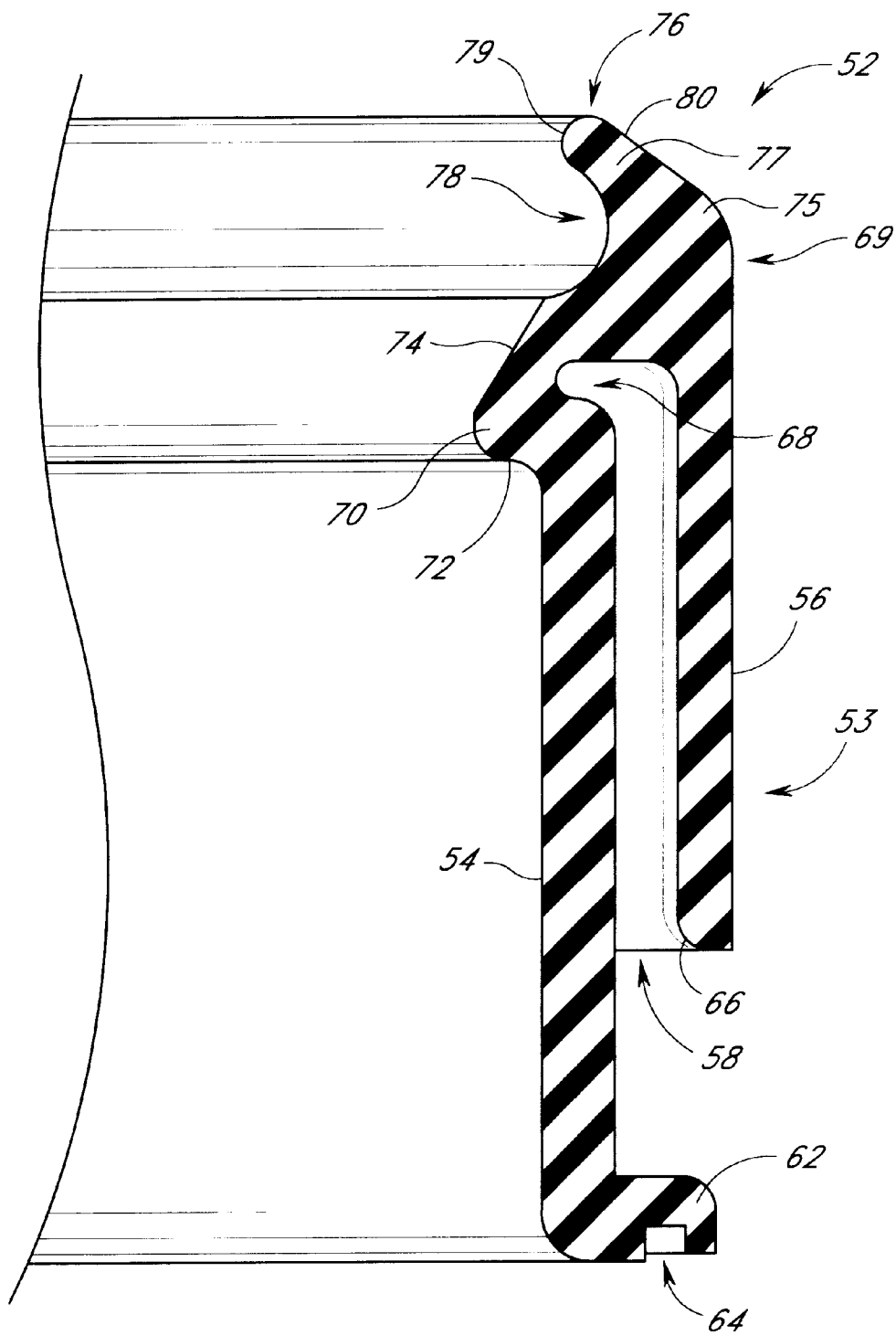
FIG. 4 is an enlarged partial cross-sectional side view taken along lines 4—4 of the conventional seal shown in FIG. 4.
Figure 5:
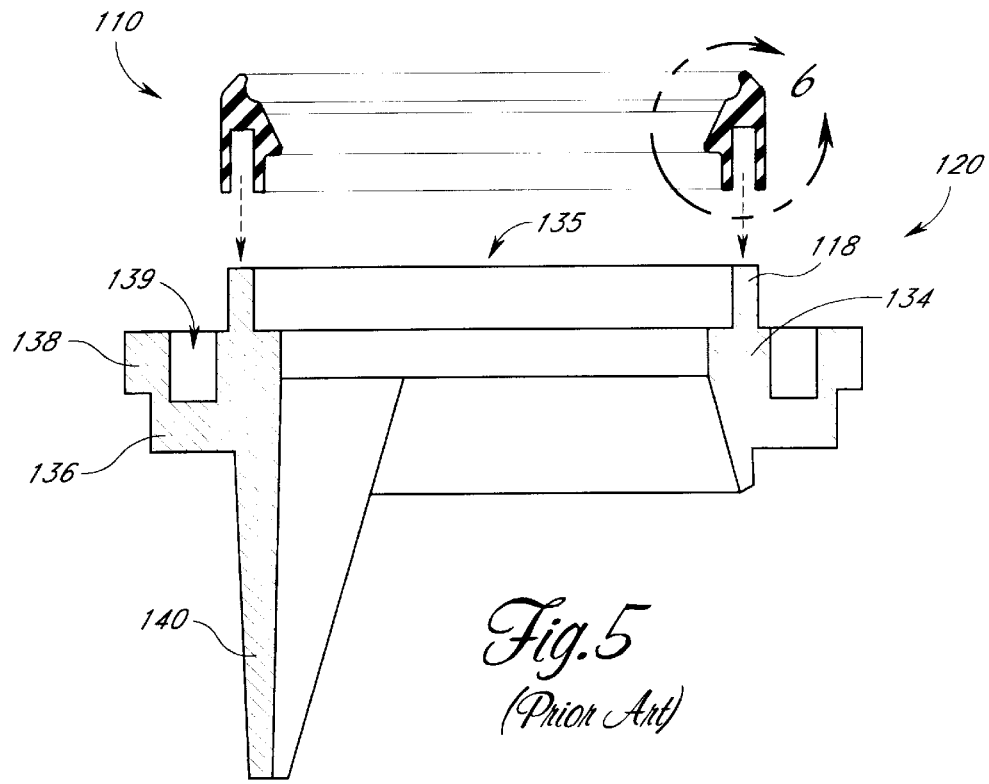
FIG. 5 is an exploded cross-sectional side view of a conventional seal and a conventional seal support.
Figure 6:
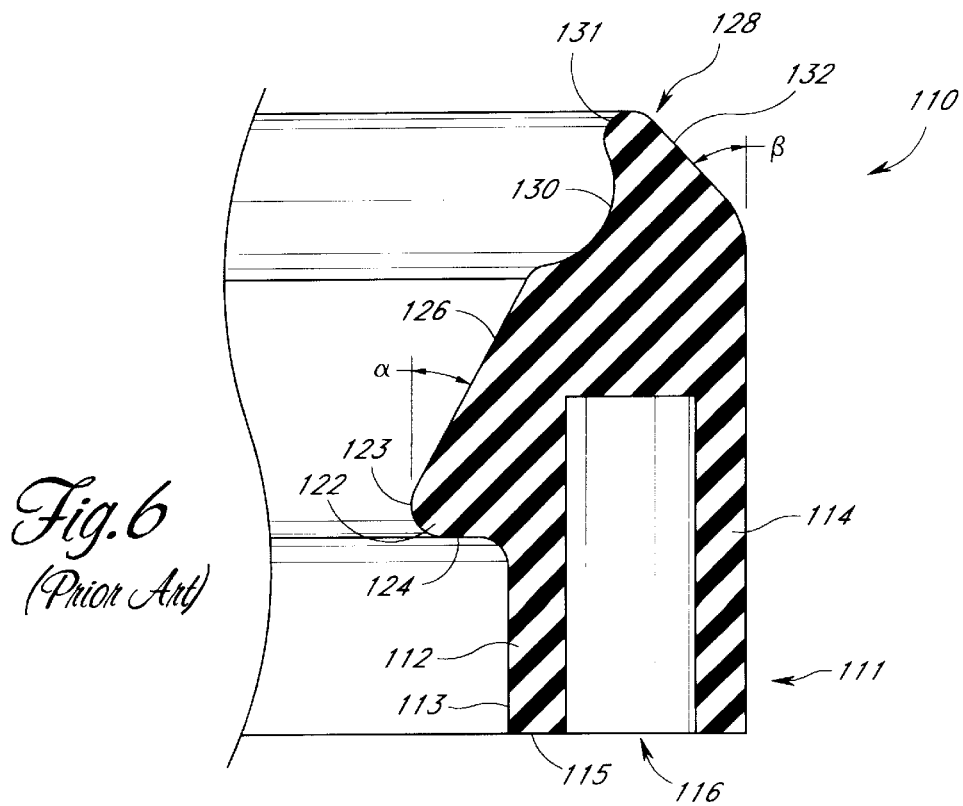
FIG. 6 is an enlarged partial cross-sectional side view taken along lines 6—6 of the conventional seal shown in FIG. 5.
Figure 7:
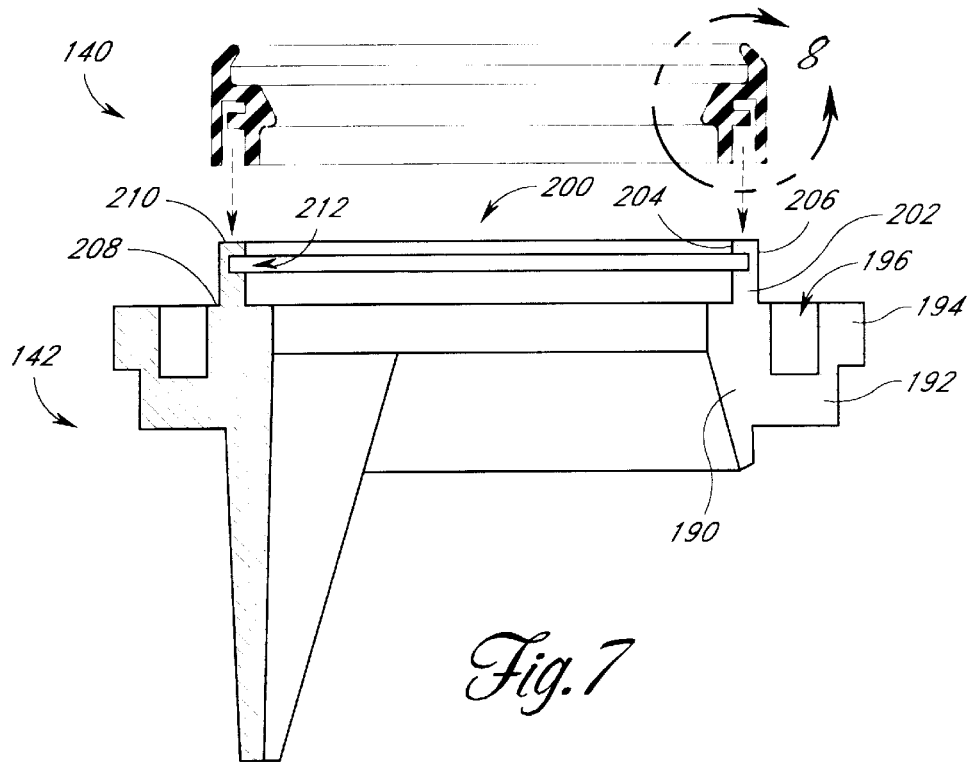
FIG. 7 is an exploded cross-sectional side view of the seal and seal support for a fuel nozzle in accordance with a preferred embodiment of the present invention.
Figure 8:
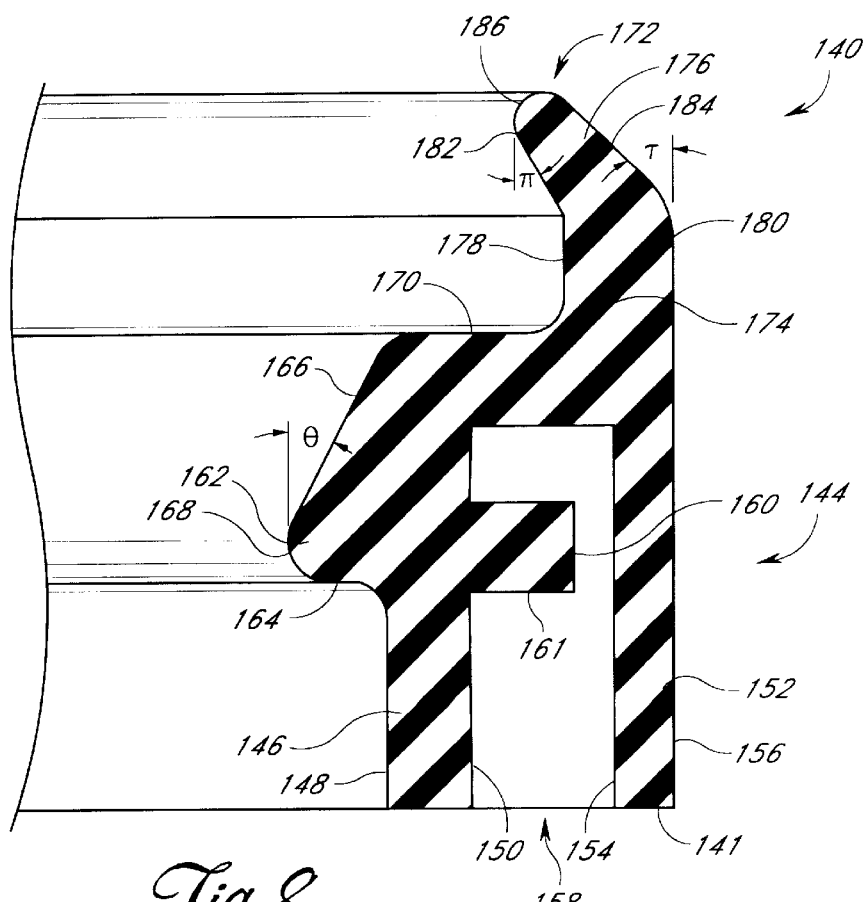
FIG. 8 is an enlarged partial cross-sectional side view along lines 8—8 of the seal shown in FIG. 7.

As seen in FIGS. 7 and 8, the present invention includes an improved seal 140 and seal support 142 which can be used with standard aircraft fuel nozzles and refueling adapters. As described below, the seal 140 and seal support 142 are sized and shaped to be used with standard aircraft fuel nozzles having an inside diameter of about 2.3 inches, but it will be understood that the seal and seal support can be sized and shaped to be used with nozzles having larger or smaller sizes. Accordingly, the dimensions of the seal 140 and seal support 142 given below are only exemplary, and the seal and seal support may have larger or smaller dimensions.

The seal 140 includes a lower portion 144 with a generally planar base 141, a first annular leg 146 with a cylindrical inner surface 148 and a cylindrical outer surface 150, and a second annular leg 152 with a cylindrical inner surface 154 and a cylindrical outer surface 156. The first leg 146 preferably has a thickness of about 0.06 inches and the second leg 152 has a thickness of about 0.05 inches. The spaced legs 146 and 152 are separated by an annular cavity 158 with a generally rectangular configuration having a height of about 0.31 inches and a width of about 0.12 inches. An annular projection 160 having a generally rectangular cross section extends radially outward from the outer surface 150 of the first leg 146 and into the cavity 158. The projection 160 preferably has a height of about 0.07 inches and a width of about 0.085 inches, and the lower surface 161 of the projection is preferably about 0.175 inches from the base 141 of the seal 140. The projection 160 preferably extends more than half way through the cavity 158 and the projection is preferably located towards the upper portion of the cavity, but the projection may have any desired size, configuration and positioning.

The inner surface 148 of the inner leg 146 has a height of about 0.07 inches and it forms an inner cylindrical annular surface of the seal with a diameter of about 2.485 inches. Inwardly extending from the inner surface 148 of the first leg 146 is an annular lip 162. The annular lip 162 includes a generally flat, annular lower surface 164, which is preferably orthogonal to the first leg 146, and an angled surface 166. The innermost point 168 of the lip 162 is preferably spaced inwardly about 0.07 inches from the inner surface 148 of the first leg 146. The angled surface 166 is at an angle θ of about 30° with respect to a vertical axis and this surface is configured to contact and abut the outer annular surface of the poppet valve (not shown). The intersections of the surfaces 148, 164 and 166 are curved with a radius of about 0.030 inches, but these surfaces may be joined with any desired radius and at any desired angle.

The seal 140 includes a generally horizontal, planar, annular upper surface 170 which is about 0.14 inches in length and extending upwardly from the, planar upper surface is a nose 172 with a generally cylindrical body portion 174 and an inwardly angled, annular projection 176. The body portion 174 has a generally rectangular cross section with an annular inner surface 178 and an annular outer surface 180. The body 174 has a height of about 0.19 inches and a thickness of about 0.0875 inches, but the body can be larger or smaller. The outer surface 180 of the body 174 is preferably vertically aligned with the outer surface 156 of the second leg 152, but these surfaces do not have to be aligned. The projection 176 includes an inner surface 182 which is about 0.06 inches in length at an angle π of about 30° with respect to vertical, and the outer surface 184 of the projection 176 is about 0.09 inches in length at an angle τ of about 45° with respect to vertical. The inner and outer surfaces 182 and 184 of the projection 176 respectively converge at an angle of about 15° and the tip 186 of the projection 176 is curved at a radius of about 0.025 inches.

The seal 140 is preferably constructed from a stiff elastomeric material such that it generally retains its shape during use of the fuel nozzle. More preferably, the seal has sufficient rigidity to retain its shape at high fluid flow rates and pressures, and the seal is sufficiently rigid to prevent the seal from being extruded off or dislodged during use without requiring that the seal be bonded to the seal support. Most preferably, the seal 140 is constructed from an elastomeric material and, in particular, from a polyurethane elastomer manufactured by the Coastcraft Rubber Company of Torrance, Calif., but the seal can also be made of other materials such as plastic or other synthetic material or natural materials having suitable characteristics.

The seal 140 desirably has a hardness of about 90 or more on the Shore hardness "A" scale (ASTM), according to standard engineering principles. With a Shore hardness of 90, testing conducted by the applicant has shown that the seal has been able to withstand pressure testing of over 300 psig. Alternatively, the seal may have a hardness of less than 90 Shore on the "A" scale, but the seal may need to be bonded to the nozzle because testing has revealed that a seal with a Shore hardness of about 70 on the "A" scale may work for its intended purpose if the seal is bonded to the nozzle.

The seal 140 is designed to be used with systems having flow rates of 500 gallons per minute (gpm) or more, and testing by the Applicant has shown satisfactory performance of the seal up to flow rates of 1200 gpm, which is much greater than the standard flow rate of 500 gpm for an aircraft fueling nozzle. The seal 140 is also designed to retain its desired shape so that the pressure of the fluid will not deform the seal and cause the system to leak. The seal has been subjected to pressure testing of 300 pounds per square inch, gauge (psig) and it has not unacceptably deformed.

The seal 140 of the present invention has a thinner nose 172 than the conventional seals shown in FIGS. 1–6 because of the increased hardness and rigidity of the seal. Specifically, the body portion 174 and the projection 176 of the nose 172 are thinner because when the nozzle is inserted into the aircraft refueling coupling, the seal 140 must deform to allow connection of the parts. Because the seal 140 is more rigid and more difficult to compress or deform than conventional seals, the nose 172 is thinner to allow connection of the fuel nozzle to the aircraft fueling adaptor. Advantageously, the thinner nose ensures tight connection of the parts without leakage of the fluid and, because the seal 140 does not have to be bonded to the fuel nozzle, this greatly simplifies repair and replacement of the seal.

The seal 140 is connected to a seal support 142, as best seen in FIG. 7. The seal support 142 includes an annular body 190 with a radially outwardly extending annular flange 192 and an upwardly extending annular arm 194 which form an annular groove 196. The seal support 142 includes an opening 200 with an inside diameter of about 2.3 inches and the annular body 194 has an outside diameter of about 2.97 inches. The seal support 142 also includes an upwardly extending projection 202 with an inner surface 204 and an outer surface 206. The projection 202 has a generally rectangular configuration with a base 208 and an upper surface 210, and the projection has width of about 0.25 inches and a height of about 0.312 inches. The inner surface 204 of the projection 202 includes a generally rectangular deep annular groove 212. The lower portion of the annular groove 212 is about 0.17 inches from the base 208 of the projection 202 and the groove has a height of about 0.065 inches and about 0.070 inches. The groove 212 is configured to receive the projection 160 of the seal 140.

The seal 140 is removed from the seal support 142 by extending the nozzle poppet valve into the open position and manually removing the seal from the seal support. For example, a person's hands can be used to lilt and pry the seal 140 off the seal support 142. Although the person can use tools to remove the seal, tools are not required and advantageously no bonds must be broken to remove the seal. In order to install a new seal, the seal 140 is simply aligned with the projection 202 of the seal support 142 and the projection is inserted into the cavity 158 of the seal. The projection 160 of the seal 140 is positioned inside the groove 212 in the seal support 142 to securely attach the seal to the seal support. Advantageously, the seal 140 does not have to be bonded to the seal support because of the hardness and rigidity of the seal, but the seal can be bonded to the seal support if desired.

Although this invention has been described in terms of certain preferred embodiments, other embodiments apparent to those of ordinary skill in the art are also within the scope of the invention. Accordingly, the scope of the invention is intended to be defined only by the claims which follow.

What is claimed is:

1. An annular seal for an aircraft fuel nozzle including a cylindrical support with an annular groove in a radially inner surface of the support, said seal, comprising:

a body including a lower portion and an upper portion, the lower portion including an annular first leg and an annular second leg spaced from the first leg to define an annular cavity, the cavity having a width and a height configured to receive said support; and a projection attached to the first leg which extends radially about two-thirds the way across the width of the cavity, and is configured to fit with said annular groove, said seal body, including said seal projection being constructed of an elastomer having a hardness rating that enables the seal to be manually installed or removed from said support and to withstand pressure testing of over 300 psig without having the seal bonded to the support.

2. The seal of claim 1, wherein the width of the cavity is about 0.12 inches and the width of the projection is about 0.08 inches.

3. The seal of claim 1, wherein the projection is located in an upper portion of the cavity.

4. The seal of claim 1, further comprising an annular nose including a body portion with a width less than the width of the cavity.

5. The seal of claim 1, further comprising an annular nose including a body portion with a width less than about 0.12 inches.

6. The seal of claim 1, further comprising an annular nose including a body portion with a width less than about 0.08 inches.

7. The seal of claim 1, further comprising an annular a nose having a body portion and an inwardly extending annular projection, the projection having a base attached to the body portion, the base of the projection having a width less than about 0.12 inches.

8. The seal of claim 1, further comprising an annular nose including a body portion with a generally cylindrical inner surface and a. generally cylindrical outer surface.

9. The seal of claim 8, wherein the inner surface of the body portion is generally concentric with the outer surface of the body portion.

10. The seal of claim 10, wherein the inner surface of the body portion is generally concentric with the first leg.

11. The seal of claim 1, wherein the seal has a Shore hardness of about 90 or greater on the "A" scale.

12. The seal of claim 1, wherein the seal is constructed of a polyurethane elastomer.

13. The seal of claim 1, including an annular nose attached to the body, the nose including a support portion with a width less than the width of the cavity.

14. The seal of claim 13, wherein the support portion of the nose has a width less than about 0.12 inches.

15. The seal of claim 13, wherein the support portion of the nose has a width less than about 0.08 inches.

16. The seal of claim 13, further comprising an inwardly extending annular projection having a base attached to the support portion of the nose, the base of the projection having a width less than about 0.12 inches.

17. The seal of claim 13, wherein the support portion has a generally cylindrical inner surface and a generally cylindrical outer surface.

18. The seal of claim 17, wherein the inner surface of the support portion is generally concentric with the outer surface of the support portion.

19. The seal of claim 17, wherein the inner surface of the support portion is generally concentric with the first leg.

20. A nozzle comprising:
a seal including an annular first leg having a generally cylindrical inner surface and a generally cylindrical outer surface, and an annular second leg having a generally cylindrical inner surface and a generally cylindrical outer surface, and an annular cavity positioned between the first leg and the second leg;
a projection attached to the first leg of the seal and extending about two-thirds the way across the width of the cavity; and
a seal support including an annular body with an annular support member, the support member having an inner surface and an outer surface, the support member having an annular groove configured to receive the seal projection;
said seal being formed of material that enables the seal to withstand pressure testing of over 300 psig without leakage and without the seal being bonded to the support so that said seal may be manually installed and removed from the support.

21. The nozzle of claim 20, wherein the lower surface of the seal support annular groove is between about 0.15 inches and about 0.20 inches from the base of the annular projection.

22. The nozzle of claim 20, wherein the lower surface of the seal support annular groove is between about 0.17 inches and about 0.18 inches from the base of the annular projection.

23. The nozzle of claim 20, wherein said seal support annular groove has a distance between the lower surface and the upper surface of about 0.05 inches and about 0.15 inches.

24. The nozzle of claim 20, wherein said seal support annular groove has a distance between the lower surface and the upper surface of about 0.06 inches and about 0.07 inches.

25. The nozzle of claim 20, wherein the width of the cavity is about 0.12 inches and the width of the projection is about 0.08 inches.

26. The nozzle of claim 20, further comprising an annular nose attached to the seal, the nose including a body portion with a width less than the width of the cavity.

27. The nozzle of claim 20, further comprising an annular nose attached to the seal, the nose including a body portion with a width less than about 0.115 inches.

28. The nozzle of claim 20, wherein the seal has a Shore hardness of at least about 90 on the "A" scale.

29. The nozzle of claim 20, wherein the seal is constructed of a polyurethane elastomer.

30. The nozzle of claim 20, further comprising an annular nose attached to the seal, the nose including a body portion with a generally cylindrical inner surface and a generally cylindrical outer surface.

31. A nozzle, comprising:
a seal including an annular first leg having a generally cylindrical inner surface and a generally cylindrical outer surface, an annular second leg having a generally cylindrical inner surface and a generally cylindrical outer surface, and an annular cavity positioned between the first leg and the second leg;
a projection attached to the first leg of the seal which extends radially to the cavity, the projection having a Shore hardness of about 90 or greater on the "A" scale; and
a seal support including an annular body with an annular support member, the support member having a generally cylindrical inner surface and a generally cylindrical outer surface, the support member having a slot configured to receive the projection from the seal;
the radial dimension of the projection being sufficient to securely attach the seal to the seal support without bonding the seal to the seal support and said seal being able to withstand pressure testing of 300 psig without leaking.

32. A method of attaching a seal to an aircraft fueling nozzle, comprising:
providing a seal support including an annular body with an annular support member, a support member having an inner surface and an outer surface, the inner surface of the support member including an annular slot;

providing a seal including a first leg having an inner surface and an outer surface, a second leg having an inner surface and an outer surface, a cavity positioned between the first leg and the second leg, the seal including a projection attached to the first leg and extending about two-thirds across the width of the cavity; and inserting a support member of the seal support into the cavity of the seal such that the projection is placed in the slot without bonding the seal to the support, wherein the seal is formed of a material having a shore hardness of about 90 or greater on the "A" scale.

* * * * *